Oct. 31, 1939.  W. T. DUNN  2,177,872
POWER TRANSMISSION
Filed July 15, 1935  2 Sheets-Sheet 2
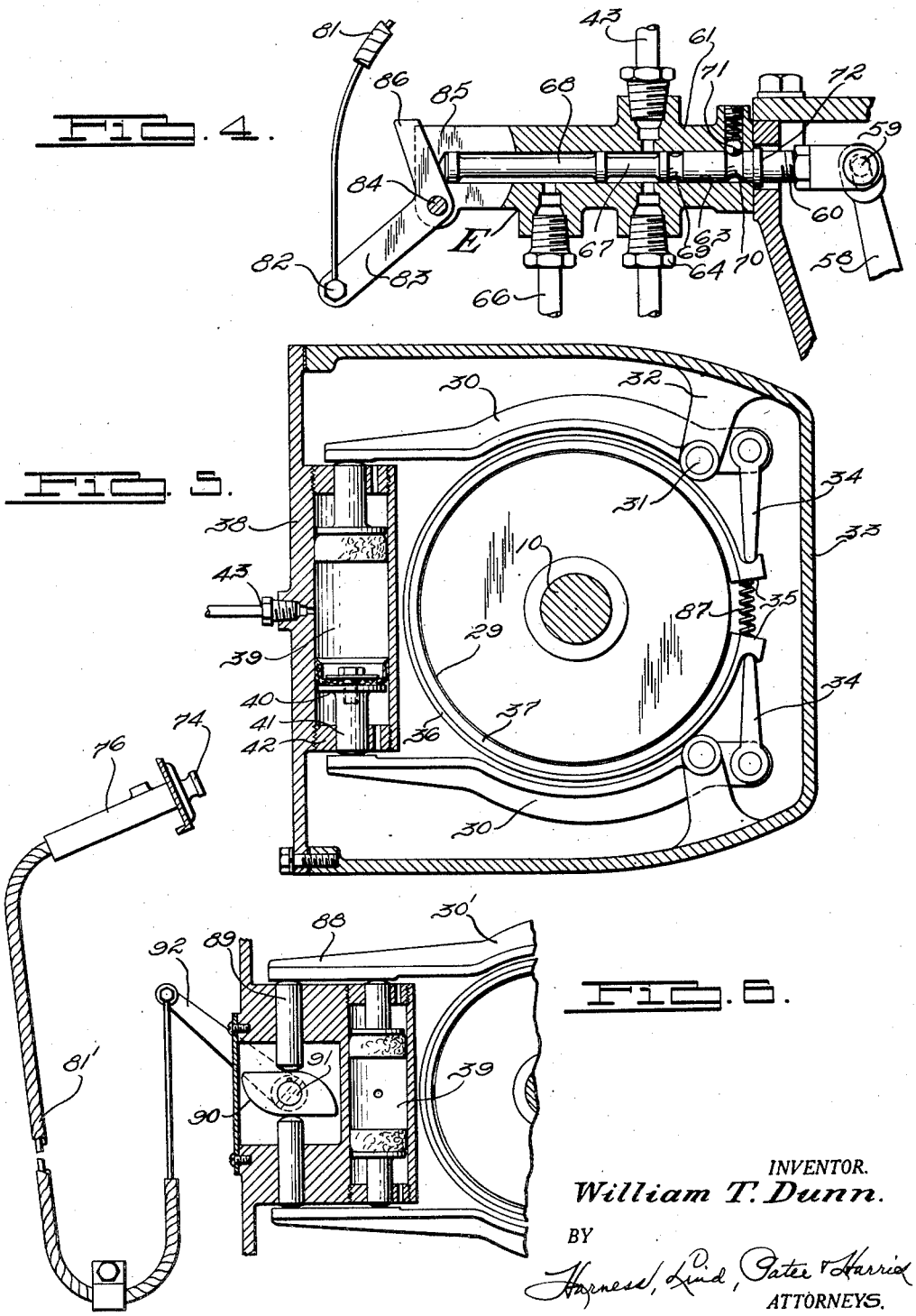
INVENTOR.
William T. Dunn.
BY
Harness, Lind, Gates & Harris
ATTORNEYS.

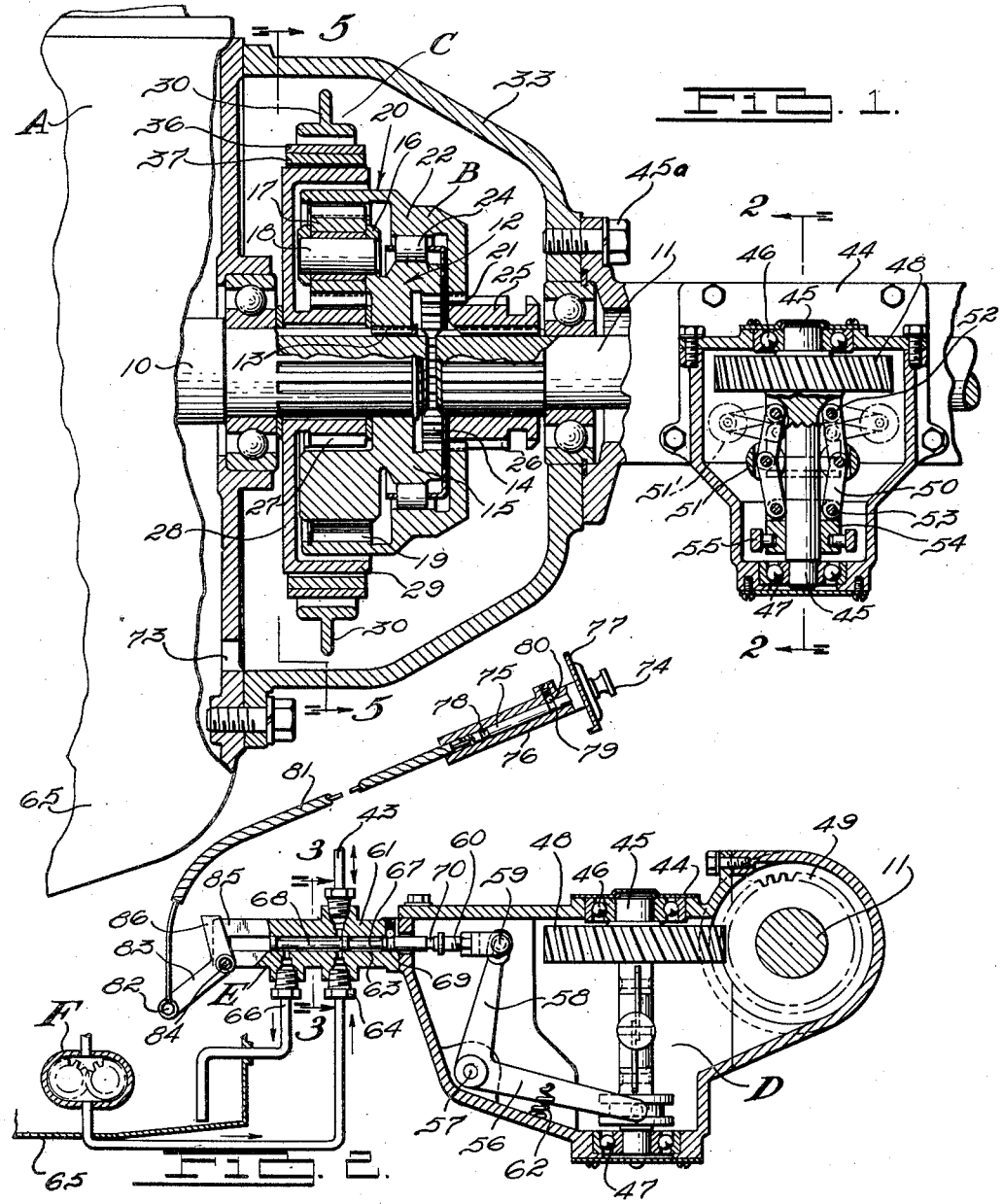

Patented Oct. 31, 1939

2,177,872

UNITED STATES PATENT OFFICE 2,177,872

POWER TRANSMISSION

William T. Dunn, Detroit, Mich., assignor to Chrysler Corporation, Highland Park, Mich., a corporation of Delaware Application July 15, 1935, Serial No. 31,319

10 Claims. (Cl. 74—260)

This invention relates to power transmission and refers more particularly to improvements in speed ratio changing mechanism especially adapted for use in driving motor vehicles.

One object of my invention is to provide a simplified speed ratio changing mechanism preferably providing an overdrive speed, or a speed greater than 1 to 1 between driving and driven shafts in the transmission of power from the engine to the vehicle ground wheels.

More particularly, further objects of my invention are to provide a mechanism of the character aforesaid having improved characteristics of long life, quietness of operation, and automatic response to the speed of vehicle travel.

Another object of my invention is to provide a power transmission, particularly an overdrive having either automatic speed responsive operation or manual control either separately or cooperatively arranged for selective operation in the same mechanism. Such arrangement of selective control is especially useful in the event of failure of one of the controlling systems.

A further object of my invention is to provide an overdrive mechanism which may be manufactured at relatively low cost in comparison with mechanisms successfully used heretofore for the same general purpose.

Further objects and advantages of my invention will be more apparent from the following detailed description of several preferred embodiments which my invention may assume, reference being had to the accompanying drawings, in which:

Fig. 1 is a sectional elevational view through my overdrive mechanism.

Fig. 2 is a sectional view somewhat diagrammatic in form taken for the most part along line 2—2 of Fig. 1.

Fig. 3 is a detailed sectional view along line 3—3 of Fig. 2.

Fig. 4 is an enlarged sectional view of the valving mechanism as shown in Fig. 2.

Fig. 5 is a sectional view taken approximately as indicated by line 5—5 of Fig. 1.

Fig. 6 is a view in general corresponding to Fig. 5 but illustrating a modified arrangement of control of my overdrive mechanism.

In the drawings, reference character 10 represents the driving shaft receiving power from the usual engine (not shown) and may be the power take-off shaft of the customary transmission A although my mechanism may, if desired, be located at other points in the drive for the vehicle. Shaft 10 drives driven shaft 11 leading to the usual ground wheels (not shown).

The drive between shafts 10 and 11 is preferably arranged for a direct drive with the overdrive automatically coming into action when the vehicle speed reaches or exceeds a predetermined desired value such as around 40 to 55 miles per hour for example. Thus, shaft 10 drivingly mounts a member 12 through the teeth 13, this member having internal clutch teeth 14, a cam 15 providing the usual inner clutch portion of a well known type of overrunning clutch B, and also a planetary carrier 16 for mounting a series of planetary gears one of which is shown at 17. A shaft 18 rotatably mounts each planetary gear on carrier 16.

Surrounding the end of shaft 10 concentric therewith is the internal gear 19 formed on the forward part of cylinder 20. This cylinder has a portion extending rearwardly and downwardly around the forward end of shaft 11 to provide clutch teeth 21. An intermediate portion 22 provides the outer cylindrical portion of clutch B, rollers 24 acting between clutch portions 15 and 22. Slidably splined on shaft 11 is a shiftable clutch member 25 having clutch teeth 26 always engaging teeth 21 and shiftable by any suitable means to engage teeth 14 at times when a two-way direct drive is desired between shafts 10 and 11 for forward as well as reverse drives.

The planetary gear train, in addition to gears 17 and 19, further comprises a sun gear 27 through which shaft 10 freely extends, the sun gear having an outwardly extending hub 28 terminating in a hub 29 surrounding the internal gear 19. Surrounding drum 29 is a braking means C comprising a pair of levers 30 pivotally supported at 31 by brackets 32 of casing 33. The short end of each lever pivotally carries an actuating finger 34. These fingers project toward each other to engage the adjacent ends 35 of a resilient brake band 36 carrying friction lining 37 engageable with drum 29.

Diametrically opposite the band ends 35 the casing has a cover plate 38 formed with a cylinder 39 slidably accommodating the piston assemblies 40 each having a rod 41 extending through cylinder end closure 42 for contact with the end of the longer end of a lever 30. Fluid, which may be air at more than or less than atmospheric pressure, but which is preferably oil or the like under pressure is admitted to cylinder 39 by a conduit 43, this conduit leading to a suitable valve control source of supply controlled manually or automatically in response to vehicle speed.

This valve control supply is best illustrated in Figs. 2 and 4 and comprises a casing 44 secured at 45ª to the rear of the casing 33 of the overdrive mechanism, this casing being adapted to house a speed responsive or governor mechanism D. This governor comprises a shaft 45 rotatably journalled in bearings 46, 47 and is driven by a gear 48 meshing with a gear 49 on the driven shaft 11.

Rotatable with gear 48 and shaft 45 is the governor linkage 50 having the weights 51 adapted, in response to centrifugal force, to fly outward about link pivots 52 to move the weights to the dotted line position 51' illustrated in Fig. 1. At their lower ends the links 50 are pivoted at 53 to a collar 54 slidable on shaft 45, this collar receiving the yoked end 55 of a bell crank lever 56 pivotally mounted at 57 to the casing and having its other upwardly projecting lever arm 58 pivotally attached at 59 to the rearwardly extending end of a valve 60 slidable in the valve housing 61. A spring 62 located in a suitable point in the mechanism yieldingly urges the governor weights 51 inwardly to the position illustrated in full lines in Fig. 1.

The valving device proper is generally designated at E and comprises the aforesaid valve housing 61 having a cylindrical bore 63 slidably accommodating the forward extending end of valve member 60. The housing 61 has a fluid pressure inlet 64 communicating with bore 63 and diametrically opposite this inlet is the fluid pressure outlet 43 which leads to the aforesaid cylinder 39. The inlet conduit 64 is supplied preferably with oil under pressure by a suitable pump diagrammatically illustrated at F and may be suitably located for pumping oil from any convenient source such as the reservoir or sump 65 of the transmission A. Forwardly of the inlet 64 the bore 63 has an outlet 66 for returning oil to the reservoir 65, it being noted that the pump F may have associated therewith a pressure relief valve (not shown) which is customary in fluid pressure pumping systems for relieving oil pressure in excess of a predetermined desired amount.

The valve 60 is formed with the reduced valving portions 67, 68 so arranged that when the governor is in the Fig. 1 position the valve portion 67 is free from communication with either of the conduits 43, 64 or 65 but the valve portion 68 is open to all of these conduits or at least conduits 64 and 66 so that oil pressure delivered by pump F will merely be circulated back to the reservoir 65 through outlet 66 without inducing a pressure in the supply conduit 43 leading to cylinder 39. When the governor weights 51 move to their outer positions 51' then bell crank lever 56 acts to move valve 60 forwardly to the position of the parts illustrated in Fig. 4 in which instance valve portion 67 provides communication between oil supply conduit 64 and the delivery conduit 43, it being noted that the return conduit 66 is no longer open to the supply conduit so that the oil under pressure from pump F will be delivered to the cylinder 43.

In order to prevent a hunting movement of governor D so that its action in moving valve 60 forwardly or rearwardly will be quick and positive, I have provided valve 60 with spaced grooves 69 and 70 adapted for selective registration with a spring pressed ball detent 71 in the two positions of the valve and if desired the valve may carry a shoulder 72 adapted to further limit the extreme forward movement of the valve.

When valve 60 is in the Fig. 2 position it will further be noted that oil returned from cylinder 39 through conduit 43 will pass through the valve portion 68 to the reservoir 65 by reason of the return conduit 66. Any oil which may escape from cylinder 39 may conveniently drain back to the reservoir 65 through an opening 73 in the wall dividing the transmission A from the overdrive mechanism in casing 33.

As a further feature of my invention which may or may not be employed as deemed advisable, I have provided a manually operable controlling means for rendering the governor D ineffective either prior to its operation in moving valve 60 forwardly or else subsequently to its said operation in which case the governor and valve may be moved at the will of the operator to their positions shown in Fig. 2.

This manual control comprises a knob or handle 74 secured to a rod 75 slidable in a housing 76 secured to the vehicle dash 77 or at any other suitable point for convenient operation by the vehicle driver. The rod 75 has a pair of spaced grooves 78, 79 selectively engageable in the extreme positions of movement of the rod with a spring pressed ball detent 80 for advising the operator of the proper positioning of the rod and also for yieldingly holding the rod in the desired position of movement. The rod 75 is connected through a suitable linkage mechanism such as a Bowden wire 81 to a point of connection 82 with a bell crank lever 83 pivotally mounted at 84 to the forward end of the valve housing 61, this end having a slotted portion 85 for swingingly receiving the upstanding end 86 of the bell crank lever 83.

When the governor D is positioned as in Figs. 1 and 2 the forward end of valve 60 is spaced from the lever end 86 but when the governor operates in response to the predetermined speed of shaft 11 sufficiently to move the valve 60 forwardly, the forward end of the valve contacts with this lever portion 86 as illustrated in Fig. 4. With the parts so positioned, the operator may pull the handle 74 to engage groove 78 of rod 75 with the detent 80 thereby swinging the bell crank lever 83 on its pivot 84 and forcing the lever end 86 to swing rearwardly in the slotted portion 85 of valve housing 61 and thereby forcibly move valve 60 rearwardly accompanied with a downward movement of governor collar 54 to restrain the weights 51 inwardly against their tendency to fly outwardly. The purpose of this control will be presently apparent.

In the operation of the mechanism as a whole and with the parts positioned as in Figs. 1 to 3 and Fig. 5, a one-way drive is provided between shafts 10 and 11 by reason of the overrunning clutch B, this drive passing from driving member 12 through the overrunning clutch and thence through teeth 21, 26 to clutch 25 and driven shaft 11. Under such condition, and as long as the predetermined critical speed of vehicle travel is not reached, the driven shaft 11 may at any time overrun the driving shaft 10 when the power applied to shaft 10 is reduced to obtain a free wheeling action for the vehicle, and if it is desired to dispense with this free wheeling action or one-way drive, the clutch 25 is shifted forwardly to engage teeth 26 thereof with teeth 14 of the driving member 12 so that the inner and outer parts of the overrunning clutch are locked together to provide a two-way drive between shafts 10 and 11.

When the clutch device 25 is shifted to the position illustrated in Fig. 1, the automatic overdrive mechanism is free to act at any time that the driven shaft 11 has sufficient speed to cause the governor to move the valve 60 forwardly to the Fig. 4 position. Prior to this governor operation and during the condition of direct drive between shafts 10 and 11 it will be noted that the braking device C is free from engagement with the drum 29 of sun gear 27 and since the members 12 and 20 are respectively drivingly connected to the shafts 10 and 11 the entire planetary gearing will revolve with these shafts without relative movement of the parts thereby resulting in a very quiet normal operation of the vehicle, minimization of the wear of the gearing and parts associated therewith, and other apparent advantages.

When the governor D comes into operation to move the valve 60 to the Fig. 4 position, oil under pressure from pump F will pass through conduits 64 and 43 for delivery to cylinder 39 whereupon the pistons 40 will be moved outwardly to cause fingers 34 to contract the brake band 36 and grip drum 29 to hold the sun gear 27 stationary. This will immediately cause the cylinder 20 and driven shaft 11 to run faster than the driving shaft 10 by an amount determined by the value of the planetary gearing train. This action is permitted by the overrunning clutch B since the cylinder 20 is free to rotate faster than the driving member 12. The motor vehicle is now driven in the overdriving speed and when the vehicle slows down sufficiently, the spring 62 will act to move the governor weights 51 inwardly accompanied by a rearward movement of valve 60 thereby cutting off the supply of oil pressure to cylinder 39 and permitting oil from cylinder 39 to drain back to reservoir 65. This immediately restores the drive to the aforesaid one-way drive between shafts 10 and 11, a spring 87 shown in Fig. 5 operating to expand the brake band 36 away from contact with drum 29 and thereby move pistons 40 toward each other to their Fig. 5 positions.

Prior to the automatic operation of the overdrive, the parts being positioned as shown in Fig. 2, the vehicle driver may, if desired, pull the knob 74 to swing the lever end 86 inwardly and thereby prevent valve 60 from moving forwardly under the influence of governor D even when the speed of motor vehicle travel is sufficient to otherwise cause the governor to operate as aforesaid. Furthermore, with the overdrive mechanism in operation and with valve 60 positioned as shown in Fig. 4, the driver may, if desired, pull the knob 74 to force the valve 60 rearwardly as aforesaid to put the transmission system into a direct drive condition.

Referring now to the modification of my invention illustrated in Fig. 6, I have illustrated only a portion of the overdrive mechanism in order to avoid duplication of illustration, it being understood that the Fig. 6 embodiment is preferably used in conjunction with the mechanism described in the previous embodiment with the exception that in Fig. 6 I have provided a somewhat different type of manual control on the braking device for controlling the overdrive.

In Fig. 6 the levers 30' correspond in general with the aforesaid lever 30 but are extended beyond the cylinder 39 to provide end portions 88 engageable with plungers 89 adapted to be moved away from each other by a centrally disposed cam 90 mounted on a cam shaft 91 to which is connected a lever 92 adapted to be moted through a Bowden wire mechanism 81' leading to a hand control knob 74 and associated parts similar to the Fig. 2 arrangement.

In the operation of the Fig. 6 arrangement, the pistons 40 are adapted for movement in response to the action of the governor just as previously explained but the manual control at 74 is arranged so that the braking device is operable through levers 30' independently of the operation of the governor. Thus, in the event of failure of the fluid pressure system, or if it is desired to obtain the overdrive at a lower speed than would otherwise be afforded by the normal setting of the governor, the operator merely pulls the handle 74 to swing the lever 94 downwardly and cause the plungers 89 to separate the ends 88 of levers 30' to operate the braking device as aforesaid and thereby obtain the overdriving action between shafts 10 and 11. When such control is provided, the governor is in effect rendered inoperative since it will not produce any control on the overdrive until the handle 74 is released manually thereby throwing the system again over to the control of the governor or restoring the drive to a direct driving condition if the governor is not operating or if the speed of vehicle travel is less than that sufficient to cause operation of the governor.

What I claim is:

1. In an overdrive for motor vehicles, a driving shaft, a driven shaft, means including an overdrive gear train for operably connecting said shafts, means including driving and driven members respectively drivingly connected to said driving and driven shafts for releasably driving said driven shaft directly from said driving shaft, power operating means for effecting connection of the drive through said overdrive gear train, said power operating means including a pressure fluid operated control device for an element of said gear train, and means operable by the vehicle driver for operating said control device for effecting connection of the drive through said overdrive gear train independently of the pressure fluid operation of said control device.

2. In an overdrive for motor vehicles, a driving shaft, a driven shaft, planetary gearing operably connecting said shafts for driving said driven shaft from and at a speed greater than said driving shaft, said planetary gearing including a sun gear, means including driving and driven members respectively drivingly connected to said driving and driven shafts for releasably driving said driven shaft from and at the same speed as the driving shaft, means for coupling said shafts for a two-way direct drive therebetween independently of said planetary gearing, braking means for said sun gear, and fluid pressure operated means for actuating said braking means.

3. In an overdrive for motor vehicles, a driving shaft, a driven shaft, planetary gearing operably connecting said shafts for driving said driven shaft from and at a speed greater than said driving shaft, means including driving and driven members respectively drivingly connected to said driving and driven shafts for releasably driving said driven shaft from and at the same speed as the driving shaft, said planetary gearing including a sun gear, a planet gear, a planet gear carrier drivingly connected to one of said shafts, an internal gear adapted to be drivingly connected to the other of said shafts, braking means for said sun gear, and a clutch member splined to said driven shaft for drivingly connecting said internal gear thereto, said clutch member being shiftable to also drivingly connect said planet gear carrier to said driven shaft to provide a two-way direct drive between said shafts.

4. In a motor vehicle driving mechanism, a driving shaft, a driven shaft, planetary gear means adapted to operably connect said shafts for transmitting a drive therebetween, said planetary gear means including a driving planet gear carrier and an annulus gear respectively adapted for driving connection to said driving and driven shafts, said planetary gear means further including a sun gear, means including driving and driven members respectively adapted for driving connection to said driving and driven shafts for transmitting a releasable direct drive therebetween, clutching means for drivingly connecting said shafts independently of the drive through said planetary gear means for transmitting a direct two-way drive therebetween, said clutching means including a shiftable clutching member drivingly connected to one of said shafts and adapted when shifted to clutch with the other of said shafts, and fluid pressure operated means acting on said sun gear for controlling the drive through said planetary gear means.

5. In a motor vehicle transmission of the character described, the combination of: a drive member; a driven member; primary driving means for connecting said drive member to said driven member so as to rotate said driven member at a speed equal to the speed of said drive member, said primary driving means including a one-way clutch; secondary driving means adapted to automatically connect said drive and driven members in response to a predetermined vehicle driving speed so as to drive said driven member at a speed faster than that of the drive member, said secondary driving means including planetary gearing having a sun gear, said secondary driving means further including a fluid-actuated brake for restraining rotation of the sun gear during said faster drive; and means operable by the driver when said members are connected by the secondary drive means for effecting release of said fluid-actuated brake whereby to establish disconnection of the secondary driving means and connection of said primary driving means.

6. In a motor vehicle transmission according to claim 5; a set of clutch teeth driven with the drive member; and a set of shiftable clutch teeth driven with the driven member and adapted for shifting movement into clutching engagement with the first said set of clutch teeth to drivingly couple said members for a direct two-way drive therebetween.

7. In a motor vehicle transmission having coaxial driving and driven shafts and mechanism operable to drive the driven shaft from the driving shaft in a I to I ratio drive or in a speed ratio drive different from said I to I drive, said mechanism comprising planetary gearing having a drive-reaction-taking sun gear, said mechanism including alternately operating drive-controlling clutching and braking devices respectively adapted to establish driving connection between said shafts for said I to I drive and to hold said sun gear for said different speed ratio drive, a source of fluid under pressure, means operable in response to drive of said driven shaft for controlling delivery of the pressure fluid from said source to the one of said devices which controls the faster of said drives to effect operation of this device, and remote control means operable by the driver when driving the vehicle for rendering said pressure fluid controlling means ineffective to thereby permit release of the last said device, the other of said controlling devices operating to effect the slower of said drives when the driver operates said remote control means as aforesaid.

8. In a motor vehicle transmission having coaxial driving and driven shafts and mechanism operable to drive the driven shaft from the driving shaft in a I to I ratio drive or in a speed ratio drive different from said I to I drive, said mechanism comprising planetary gearing having a drive-reaction-taking sun gear, said mechanism including alternately operating drive-controlling clutching and braking devices respectively adapted to establish driving connection between said shafts for said I to I drive and to hold said sun gear for said different speed ratio drive, a source of fluid under pressure, means operable in response to a predetermined vehicle driving speed for controlling delivery of the pressure fluid from said source to the one of said devices which controls the faster of said drives to effect operation of this device, and remote control means operable by the driver when driving the vehicle for rendering said pressure fluid controlling means ineffective to thereby permit release of the last said device, the other of said controlling devices operating to effect the slower of said drives when the driver operates said remote control means as aforesaid.

9. In a motor vehicle transmission having coaxial driving and driven shafts and mechanism operable to drive the driven shaft from the driving shaft in a I to I ratio drive or in a speed ratio drive different from said I to I drive, said mechanism comprising planetary gearing having a drive-reaction-taking element, said mechanism including alternately operating drive controlling devices respectively adapted to establish driving connection between said shafts for said I to I drive and to hold said reaction-taking-element for said different speed ratio drive, a source of fluid under pressure, means operable in response to a predetermined vehicle driving speed for controlling delivery of the pressure fluid from said source to the one of said devices which controls the faster of said drives to effect operation of this device, and remote control means operable by the driver when driving the vehicle for rendering said pressure fluid controlling means ineffective to thereby permit release of the last said device, the other of said controlling devices operating to effect the slower of said drives when the driver operates said remote control means as aforesaid.

10. In a motor vehicle transmission having coaxial driving and driven shafts, planetary gearing operably connecting said shafts and including a sun gear and an internal gear, a drive control device operable to hold one of said gears against rotation whereby to provide reaction for driving the driven shaft from the driving shaft through said planetary gearing, a second drive control device operable to drivingly connect said shafts for a direct drive with said gears rotating in locked relationship, a source of fluid under pressure, means operating in response to drive of said driven shaft for controlling delivery of the pressure fluid from said source to one of said controlling devices to effect operation thereof to establish one of said drives, means operable by the vehicle driver when driving the vehicle for rendering said pressure fluid controlling means ineffective to thereby permit release of said pressure fluid operated controlling device, the other of said controlling devices operating automatically when said pressure fluid controlling means is rendered ineffective as aforesaid to establish the other of said drives, the last said controlling device automatically releasing the last said drive when pressure fluid is delivered as aforesaid to said pressure fluid operated controlling device.

WILLIAM T. DUNN.